Sept. 1, 1970  E. R. MILLER  3,526,151

TRANSMISSION SHIFTING MECHANISM

Filed Dec. 4, 1968  3 Sheets-Sheet 1

INVENTOR.
Ervin R. Miller
BY
Harness, Dickey & Baldwin,
ATTORNEYS

INVENTOR.
Ervin R. Miller
BY Harness, Talburtt & Baldwin
ATTORNEYS

Sept. 1, 1970          E. R. MILLER          3,526,151

TRANSMISSION SHIFTING MECHANISM

Filed Dec. 4, 1968          3 Sheets-Sheet 3

INVENTOR.
Ervin R. Miller.
BY
Harness, Talbutt & Baldwin,
ATTORNEYS.

United States Patent Office 3,526,151
Patented Sept. 1, 1970

3,526,151
TRANSMISSION SHIFTING MECHANISM
Ervin R. Miller, Detroit, Mich., assignor to Chrysler Corporation, Highland Park, Mich., a corporation of Delaware
Filed Dec. 4, 1968, Ser. No. 780,982
Int. Cl. G05g 5/10
U.S. Cl. 74—477                                    10 Claims

ABSTRACT OF THE DISCLOSURE

A transmission shifting mechanism including a pair of slideably mounted locking plates having shift recesses separated by cam portions in one end portion of each plate and a locking recess and locking edges in the other end portion of each plate. The shift recesses and cam portions are biased by a spring toward engagement with pins connected to rotatable shift shafts. Movement of one shift shaft causes the locking plates to move to prevent movement of the other shift shaft.

BACKGROUND OF THE INVENTION

This invention relates to automotive transmissions, and more particularly to an interlock mechanism for the control linkage of a manually operated transmission.

Manually operated transmissions normally include at least two shift shafts rotatably mounted in a housing and having shift forks or yokes on the inner ends thereof engageable with grooved sleeves or the like which are adapted to move either various gears into mesh with other gears of the transmission or to move clutch members into an operative position to transfer the drive from an input to an output shaft. The shift shafts are connected by linkages to the transmission gear selector. It is highly desirable that one shift shaft be held in a neutral position when the other shift shaft and its associated shifting fork is moved from a neutral position, thus preventing movement of more than one gear or clutch member at a time toward an operative position.

The prior art discloses the use of pivoted levers each having a plurality of recesses between which a pin or the like may be moved when it is desired to shift from one position to another. However, since the levers are pivoted, the effective lever arm in shifting of the pin from one recess to a second recess, may be different than the effective lever arm in shifting the pin from a third recess to the second recess. These lever arms of different lengths result in the necessity of different shifting forces unless the shape and contour of the recesses is carefully designed to compensate for the different lengths of the lever arms.

The present invention overcomes many of the problems of prior interlocking devices.

SUMMARY OF THE INVENTION

Briefly, this invention comprises a pair of slideably mounted locking plates which prevent the movement of one shift shaft if the other shift shaft is moved from a neutral position.

One of the primary objects of this invention is to provide an interlock device adapted to prevent movement of one shift shaft from a neutral position when the other shift shaft is not in a neutral position.

Another object of this invention is to provide a device of the type described which facilitates selecting and shifting of the transmission and automatically locks one or the other of the shift shafts against movement.

Still another object of this invention is to provide a device such as described in which the equal shifting forces or efforts are obtained in an effective manner.

A further object of this invention is to provide a device of the class described which is economical in construction and efficient in operation.

Other objects and advantages of this invention will be made apparent as the description progresses.

BRIEF DESCRIPTION OF THE DRAWINGS

In the accompanying drawings, in which several of various possible embodiments of this invention are shown.

Like parts are indicated by corresponding reference characters throughout the several views of the drawings.

DESCRIPTION OF THE PREFERRED EMBODIMENTS

Figure 1:
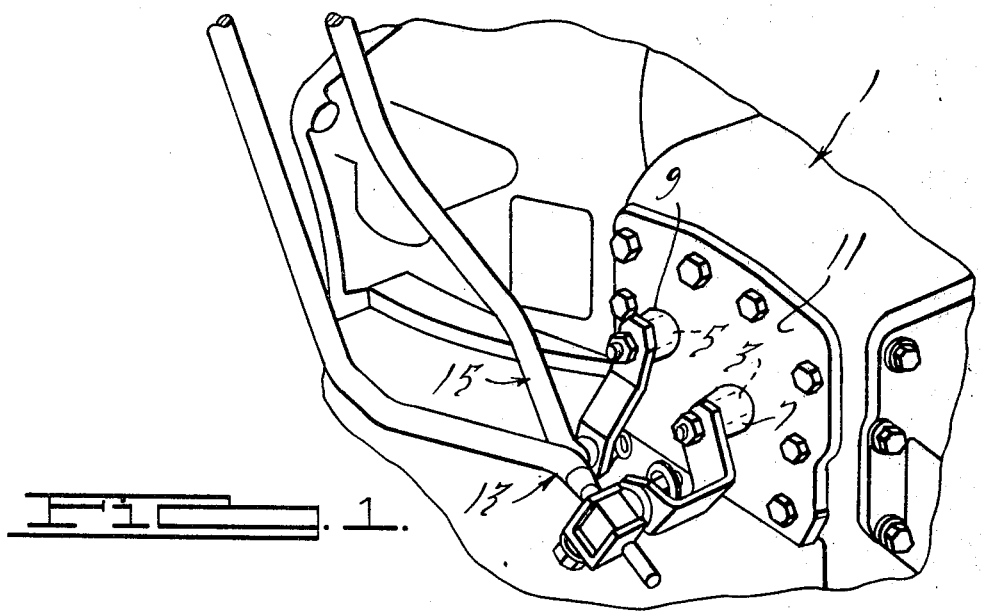
FIG. 1 is an orthographic view of a transmission employing this invention.

Referring now to the drawings, the invention is shown in connection with a manually operated four forward speed and reverse transmission of the so-called constant mesh type, wherein the four forward speeds are controlled by a linkage adapted to shift two shift yokes in a housing, although the invention is applicable to other manually operated transmissions, such as a three speed and reverse transmission.

Referring to FIG. 1 in particular, a transmission housing is generally indicated at 1. Shift shafts 3 and 5, respectively designated the first-second shaft and the third-fourth shaft, are rotatably mounted in bearing portions 7 and 9 on a cover plate 11.

The shafts 3 and 5 are connected by linkages 13 and 15, respectively, to a transmission control lever (not shown) in a well-known manner. Third-fourth shaft 5 has a shifting device 17 connected to the inner end of the shaft. Device 17 includes a lever 19 and a yoke or fork 21 connected to the lever. As will be understood, fork 21 is adapted to engage a clutch sleeve (not shown), for example, for moving the latter between a position in which a "third" gear on an output shaft is drivingly coupled thereto and a position in which the input shaft is directly coupled to the output shaft in fourth gear.

Figure 2:
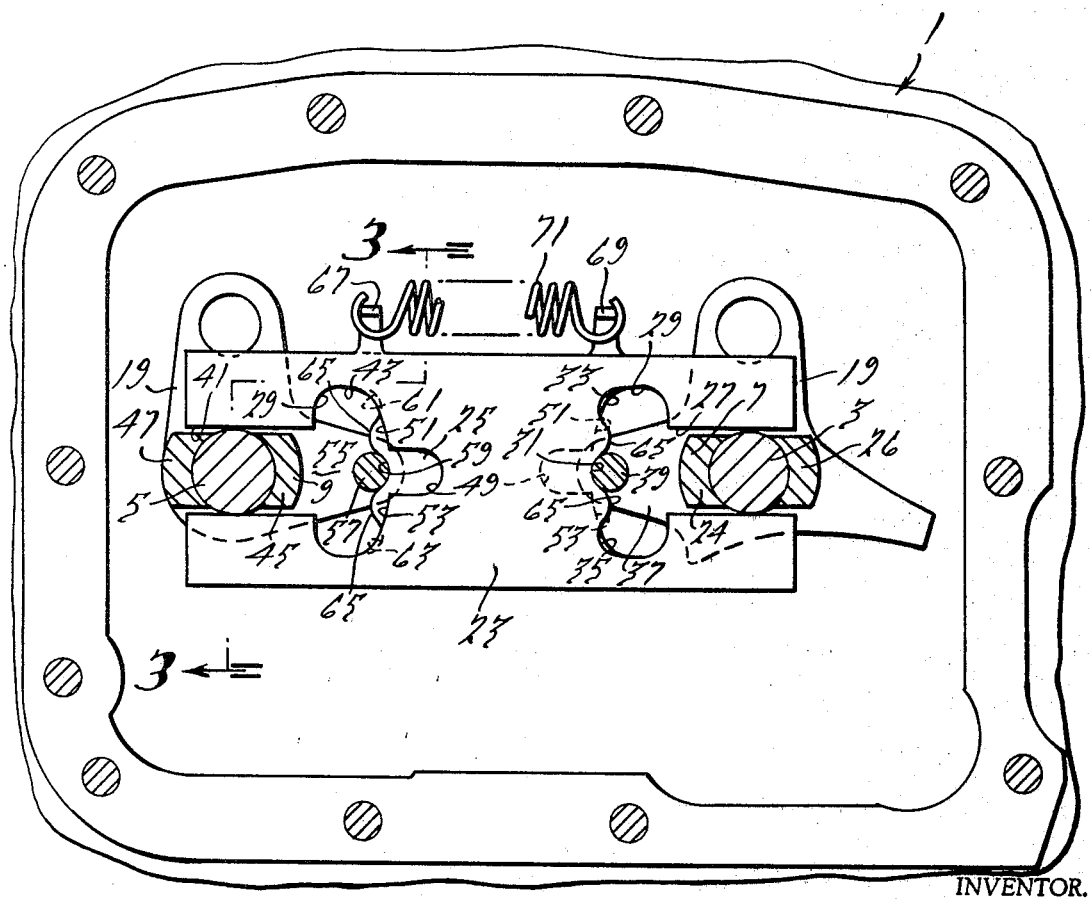
FIG. 2 is an elevation view of a portion of FIG. 1 with a cover plate removed and parts broken away for clarity.

As viewed in FIG. 2, counterclockwise rotation of shaft 5 will move a clutch member into a position to couple the input shaft to the output shaft in fourth gear, while clockwise movement of shift 5 will move the clutch member into a position in which the "third" gear will be operatively coupled with the output shaft to provide a third gear condition in the transmission. Counterclockwise movement of shaft 3, as viewed in FIG. 2, will move another clutch member, through the means of the lever and yoke connected to shaft 3, to a position in which a "second" gear is drivingly coupled to the output shaft to place the transmission in second gear. Clockwise movement of shaft 3 will move the clutch member into a position wherein a "first" gear is drivingly coupled to the output shaft to place the transmission in first gear.

The interlock device of this invention includes a pair of elongated locking plates 23 and 25 located between the bearing portions 7, 9 and the levers 19. Plate 23 has a slot 27 in the end thereof adjacent shaft 3, which slot extends lengthwise of the plate and has a width slightly greater than the diameter of shaft 3. The end portions of the plate on opposite sides of slot 27 may also ride on extensions 24 and 26 of bearing portion 7. The inner end of slot 27 opens into an enlarged opening 29 in plate 23 having three adjacent recesses 31, 33 and 35 therein.

Recess 31 may be referred to as a neutral recess while recess 33 is a first speed recess and recess 35 is a second speed recess. Recesses 33 and 35 are symmetrical in shape. The lever 19 connected to shaft 3 has an arm 37 which extends away from the lever generally toward the shaft 5. Arm 37 has a finger or pin 39 extending from the outer end thereof through opening 29. As will be made apparent, pin 29 is adapted to be swung about the axis of rotation of shaft 3 and will move into recesses 31, 33 and 35, depending on the position of shaft 3.

The other end of plate 23 has a slot 41 extending lengthwise of the plate from the end of the plate to an enlarged opening 43. Slot 41 has a width slightly greater than the diameter of shaft 5. The end portions of plate 23 on opposite sides of slot 41 may ride on extensions 45 and 47 of bearing portion 9.

The inner edge of opening 43 has a locking recess 49 which is deeper than the recesses 31, 33, 35. Camming or locking edges or surfaces 51 and 55 are provided on opposite sides of recess 49 in opening 43. The lever 19 connected to shaft 5 has an arm 57 extending generally toward shaft 3 with a pin or finger 59 extending from the outer end thereof through opening 43.

Locking plate 25 is identical in construction to plate 23, but is reversed in position. It has three recesses 59, 61, 63 in enlarged opening 29, which recesses are respectively referred to as neutral recess, fourth speed recess, and third speed recess. Recesses 33 and 35 are similar in configuration. Plate 25 also has an enlarged opening 43 with a recess 49 therein and locking edges 51 and 53 thereon. The recesses 31, 33 and 35 and the recesses 59, 61 and 63 are separated by similar camming portions 65. Like plate 23, plate 25 may ride on the shafts 3 and 5 and extensions 24, 26, 45 and 47.

Plates 23 and 25 include upwardly extending fingers 67 and 69, respectively, which are connected together by a spring 71 biasing the fingers toward one another.

The interlock device is adapted to prevent movement of either shaft 3 or 5 and the associated lever 19 and fork 21 from a neutral position when the other shaft 3 or 5 and its associated lever 19 and fork 21 are being moved from a neutral position or are located in a position other than neutral. This function is accomplished in the following manner:

As shown in FIG. 2, both shafts 3 and 5 and the associated levers 19 are in the neutral position with both pins 39 and 57 seated in the neutral recesses 31 and 59, respectively, of plates 23 and 25. When the linkage 13 is operated to rotate shaft 3 clockwise to bring lever 19 and is associated fork 21 to a first speed condition, pin 39 cams plate 23 to the left as the pin swings over camming portion 65. During this movement of plate 23 the slot 49 therein is moved over pin 59 and prevents movement of the latter from the neutral position. At the same time, the pin 39 is moving along a path adjacent the locking elge 51 in plate 25 to the right as viewed in FIG. 2, thereby also preventing the pin 57 from being swung from its neutral position. When the pin 39 moves past camming portion 65, the plate 23 moves back to the right under the influence of spring 71, thus removing slot 49 from pin 57. However, the pin 39 continues to be located adjacent the locking edge 51 of plate 25, thereby preventing plate 25 from being moved to the right and hence preventing movement of pin 57.

It is not until pin 39 is brought back to its neutral position that pin 59 will be permitted to move. Movement of the linkage 13 to cause counterclockwise movement of shaft 3 to bring such shaft and its associated lever 9 and fork 21 into second speed position causes pin 57 to be locked against movement in the same manner as described above, only the pin 39 rides against camming surface 65 and adjacent locking surface 53 of plate 23 to perform the locking function. The forces required to move the pin 39 from recesses 33 and 35 to recess 31 are equal to one another.

It will be seen that rotation of shaft 5 with consequential locking of pin 39 and shaft 3 is accomplished in a manner which is identical to the manner described above, only at the other ends of the plates 23 and 25. Thus, only one shaft 3 or 5 may be moved from the neutral position at a time, with the other shaft being locked against movement. Moreover, when either shaft is in a drive condition, i.e., out of a neutral position and in first, second, third or fourth, the other shaft cannot be rotated.

Figure 3:
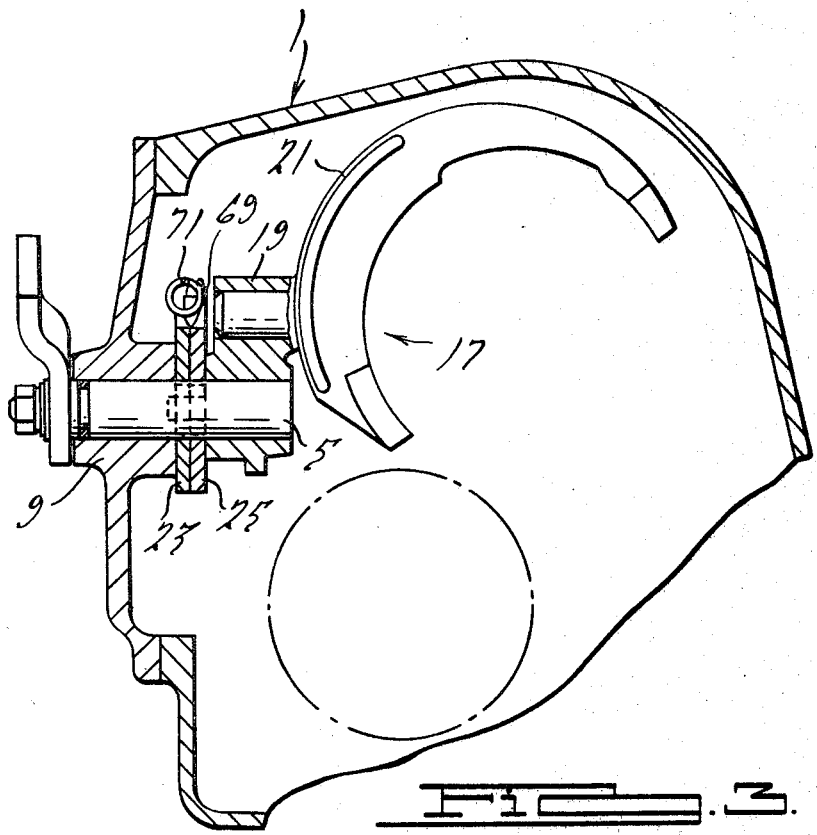
FIG. 3 is a section taken along line 3—3 of FIG. 2.
Figure 4:
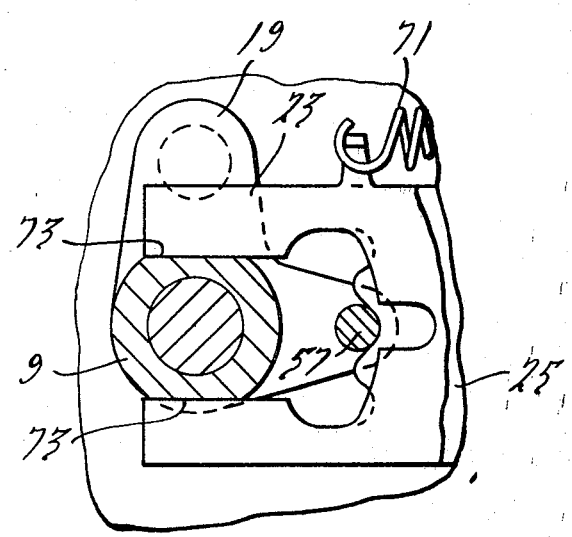
FIG. 4 is a fragmentary elevation view of FIG. 1 showing a modification of the present invention.

A modification of the interlock device of this invention is shown in FIG. 4. This modification is generally similar to the embodiment shown in FIGS. 1–3, except the plates are adapted to ride on flats 73 formed on bearing portions 7 and 9, rather than on the shafts 3 and 5.

Figure 5:
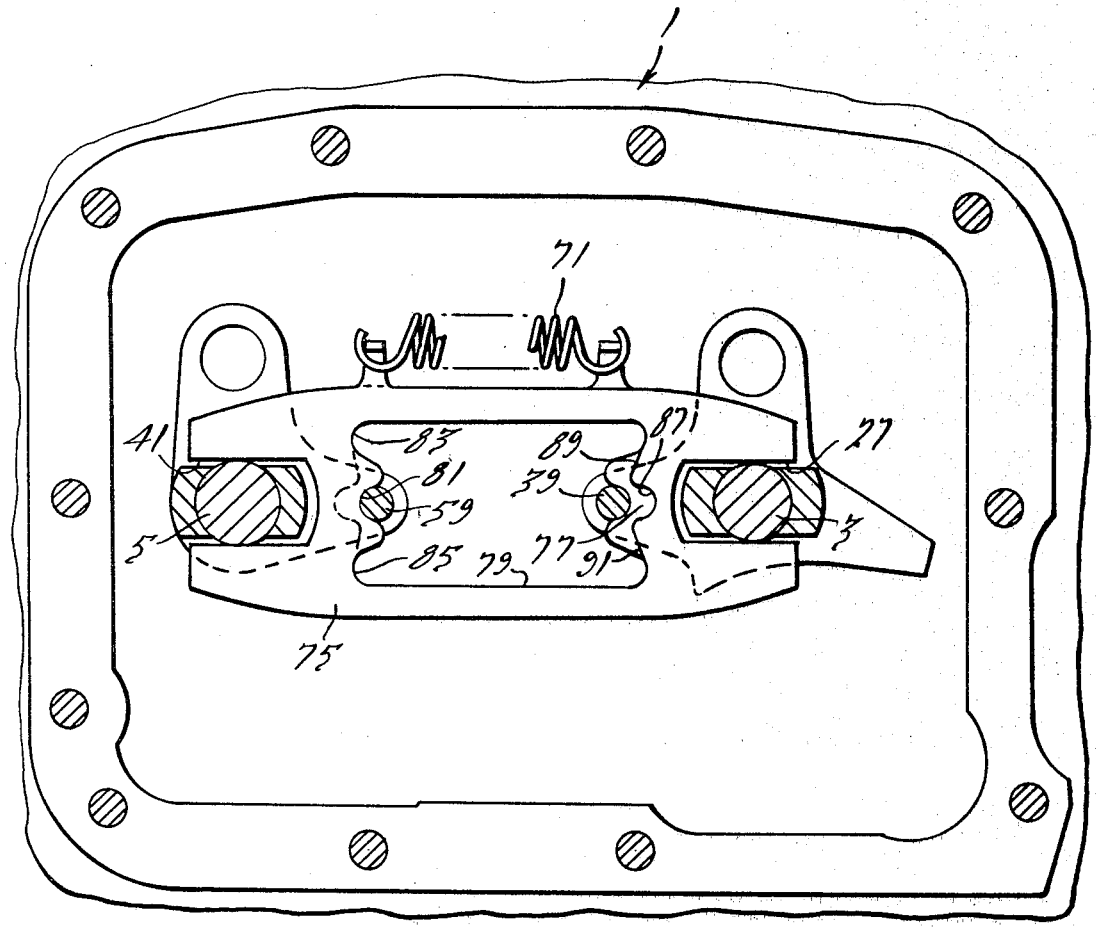
FIG. 5 is a fragmentary elevation of another modification of the present invention.

Another modification of the interlock device is illustrated in FIG. 5. This device includes two locking plates 75 and 77. The plates have slots 27 and 41 in their ends, but these slots do not open into enlarged openings as in the embodiments as shown in FIGS. 1–4. Instead, each plate has a single opening 79. Each plate, at one end of the opening 79 has three recesses 81, 83 and 85 therein which correspond generally with recesses 31, 33, 35 and 59, 61, 63 and the other end has a locking recess 87 and locking edges 89 and 91, which correspond generally to the locking recesses 59 and locking edges 51 and 63 of plates 23 and 25. When shaft 13 is rotated clockwise, pin 39 moves plate 77 to the right causing recess 87 in plate 77 to move around pin 59 and prevent movement of the latter. The proximity of pin 39 to locking edge 89 also prevents leftward movement of plate 75, thereby preventing movement of pin 59 from a neutral position. Counterclockwise movement of shaft 3 also results in locking of pin 59 in a neutral position in a similar manner. Similarly, pin 39 is locked in a neutral position when shaft 5 is rotated either clockwise or counterclockwise from a neutral position. Thus, locking of one shaft against movement from neutral position is accomplished whenever the other shaft is not in neutral position.

Moreover, since the plates are biased by spring 71 for sliding movement rather than pivoting movement, recesses 33, 35 and 61, 63 may be similar in shape and camming portion 65 may be similar in shape, thereby facilitating manufacturing and also insuring that the shifting force necessary to move the pins 39 and 59 from one position, such as first or third, respectively, for example, to neutral is the same as the force necessary for movement of pins 39 and 59 from second or fourth, respectively, to neutral. In a construction having pivoted locking levers, the angles and surfaces of the recesses would have to be different and carefully contoured, due to different length lever arms in moving from one position to another, to obtain equal shifting forces or effort.

In view of the foregoing it will be seen that the several objects and other advantages of this invention are accomplished.

Although only one embodiment of the invention has been disclosed and described, it is apparent that other embodiments and modifications of the invention are possible.

I claim:

1. A transmission shifting mechanism comprising a housing, a pair of shift means rotatably mounted in one wall of said housing, each shift means being rotatable between a neutral position and two different drive positions, and locking means for preventing rotation of one shift means from its neutral position when the other shift means is in a position other than said neutral position, said locking means comprising a pair of interlock members mounted for sliding movement toward and away from both of said shift means, each of said members toward one end thereof having a plurality of shift recesses in an edge portion thereof separated by cam positions, said recesses and said cam portions engaging one of said shift means and causing movement of the respective member when the shift means engaging the respective member is rotated, each of said members toward the other end thereof having a locking recess and locking edge portions adapted to prevent movement of one of said shift means when the other of said shift means is rotated.

2. A transmission as set forth in claim 1 wherein said shift recesses and said locking recess and locking edge portions are located on edges of openings in said locking members.

3. A transmission as set forth in claim 2 wherein said members are elongated, and said shift recesses, camming portions, locking recess and locking edge portions are located in the outer edge portions of said openings toward the ends of said members.

4. A transmission as set forth in claim 1 wherein each member is elongated and has a slot extending lengthwise of the member from each end thereof, each slot opening into an enlarged opening, said shift recesses and cam portions of each member being located on the inner edge of one opening therein and said locking recess and locking edge portion being located in the inner edge portion of the other opening in the same member.

5. A transmission as set forth in claim 4 wherein each of said shift means includes a rotatable shaft, said shafts extending through said slots in the ends of said members and supporting the latter for said sliding movement.

6. A transmission as set forth in claim 4 wherein said housing includes bearing portions in which said shift means are rotatably mounted, said bearing portions extending through said slots in the ends of said members and supporting the latter for said sliding movement.

7. A transmission as set forth in claim 6 wherein said bearing portions have flats on which said members ride.

8. A transmission as set forth in claim 1 wherein each member is elongated, each of said members includes a central opening and a slot extending lengthwise of the member from each end thereof, said shift means extending through said slots, said shift recesses and camming portions being located on the outer edge of said central opening adjacent one end of the respective member, and said locking recess and locking edge portions being located on the outer edge of said central opening adjacent the other end of the respective member.

9. A transmission shifting mechanism comprising a housing, a pair of shift shafts rotatably mounted in one wall of said housing, a lever attached to the inner end of each of said shafts, a yoke attached to each lever at a point spaced from the axis of rotation of the shaft to which the lever is attached, a pin attached to each lever and extending generally parallel to said shafts, linkage means connected to the outer ends of said shafts for rotating the shafts, and the lever, yokes and pins connected thereto between a neutral position and two shift positions, said pins being located between said shafts when said shafts are in a neutral position, and locking means for preventing rotation of one of said shafts when the other shaft is in a position other than its neutral position, said locking means comprising a pair of interlock members having slots in the ends thereof through which said shafts extend, said members being adapted to slide toward and away from both of said shafts, each of said members toward one end thereof having a plurality of shift recesses in an edge portion thereof separated by cam portions, each of said members toward the other end thereof having a locking recess and locking edge portions, means biasing said members in direction such that said shift recesses and said cam portions are biased toward engagement with said pins, one pin, upon rotation of the shaft to which the pin is connected, tending to move one member, the shift recesses and cam portions of which are biased toward said one pin, toward the other pin to move the locking recess at the other end of the member over said other pin, thereby preventing movement of said other pin and the shaft to which it is connected, said one pin when moved away from its neutral position also being adjacent one of the locking edge portions of the other member, thereby preventing movement of said other member in a direction away from said other pin to lock said other pin against movement.

10. A transmission as set forth in claim 9 wherein said housing has bearing portions in which said shafts are rotatable, said bearing portions having flats on which said members are slideably mounted.

References Cited

UNITED STATES PATENTS

| 2,438,691 | 3/1948 | Armantrout | 74—477 |
| 3,264,894 | 8/1966 | Popovich et al. | 74—477 |

MILTON KAUFMAN, Primary Examiner